US006918267B2

United States Patent
Hirota et al.

(10) Patent No.: US 6,918,267 B2
(45) Date of Patent: Jul. 19, 2005

(54) PRESS MOLDING APPARATUS AND PRESS MOLDING METHOD

(75) Inventors: Shinichiro Hirota, Fuchu (JP); Tadayuki Fujimoto, Hachioji (JP); Hidemi Tajima, Hamura (JP)

(73) Assignee: Hoya Corporation, Tokyo (JP)

( * ) Notice: Subject to any disclaimer, the term of this patent is extended or adjusted under 35 U.S.C. 154(b) by 502 days.

(21) Appl. No.: 10/227,424

(22) Filed: Aug. 26, 2002

(65) Prior Publication Data

US 2003/0102583 A1 Jun. 5, 2003

(30) Foreign Application Priority Data

Aug. 27, 2001 (JP) ........................................ 2001-255734
Sep. 28, 2001 (JP) ........................................ 2001-300637

(51) Int. Cl.[7] ........................ C03B 11/05; C03B 11/06
(52) U.S. Cl. ............................ 65/102; 65/305; 65/319; 264/1.32
(58) Field of Search ............................ 65/305, 323, 39, 65/47, 319, 317, 320, 361, 102; 425/193, 195, 407, 412, 415, 416; 249/160–162; 267/299, 319; 264/320, 322, 325, 327, 1.32; 100/214

(56) References Cited

U.S. PATENT DOCUMENTS 5,346,522 A * 9/1994 Komiyama et al. ............ 65/64
5,417,730 A * 5/1995 Shigyo et al. ................. 65/111
6,141,991 A * 11/2000 Fujimoto et al. ........... 65/29.19
2003/0033833 A1 * 2/2003 Fujimoto et al. ............. 65/102
2004/0212109 A1 * 10/2004 Fujimoto et al. .......... 264/1.32
2004/0212110 A1 * 10/2004 Fujimoto et al. .......... 264/1.32

FOREIGN PATENT DOCUMENTS

| JP | 8-133756 | | 5/1996 | |
| JP | 11-29333 | | 2/1999 | |
| JP | 11171564 A | * | 6/1999 | ........... C03B/11/00 |
| JP | 2001-10829 | | 1/2001 | |

* cited by examiner

*Primary Examiner*—Steven P. Griffin
*Assistant Examiner*—Carlos Lopez
(74) *Attorney, Agent, or Firm*—Sughrue Mion, PLLC

(57) ABSTRACT

A press molding apparatus includes upper and lower mother molds 102 and 104. Each of the mother molds 102 and 104 has four molding surfaces arranged in a single line and satisfies the relationship given by $L \times \alpha \times \Delta T/t < 0.0008$, where L represents the length, t, the thickness, $\alpha$, the thermal expansion coefficient, and $\Delta T$, the temperature difference between both ends in the thickness direction during induction heating. The press molding apparatus may include a pressing mold set including upper mother molds 102a and 102b attached to a common fixed shaft 118 through upper supporting shafts 110a and 110b and lower mother molds 104a and 104b driven by a common drive shaft 120 through lower supporting shafts 112a and 112b. The upper mother molds 102a and 102b and the lower mother molds 104a and 104b are collectively heated by induction heating coils 122 and 124, respectively.

13 Claims, 8 Drawing Sheets

PRESS MOLDING APPARATUS AND PRESS MOLDING METHOD

BACKGROUND OF THE INVENTION

This invention relates to a press molding apparatus and a press molding method for use in precision pressing in which an optical element is obtained by press molding a material, such as a preformed glass material in a heated and softened state and, in particular, to precision pressing in which no polishing is required after molding.

Recently, in a field of production of an optical element such as an optical lens, it is desired to obtain a high-accuracy lens shape without carrying out surface polishing. To this end, proposal is made of a method comprising the steps of preparing a pre-shaped glass material (preform), heating and softening the preform, and pressing the preform by a high-accuracy pressing surface (Japanese Unexamined Patent Publication JP 2001-10829 A). In particular, use is recently made of a mother mold having an elongated shape with a plurality of molding surfaces arranged in a single line so as to simultaneously press form a plurality of preforms (Japanese Unexamined Patent Publication JP 11-29333).

In the meanwhile, upon producing the optical element by precision pressing, accuracy and productivity are important aspects.

In this sense, anisothermal pressing (Japanese Unexamined Patent Publication JP 8-133756 A) has contributed to epoch-making progress. Specifically, by shortening a heating cycle of the mother mold as compared with existing isothermal pressing, the cycle time required to form the glass optical element can be shortened to the order of several tens of seconds. In addition, surface accuracy and profile accuracy can be kept superior.

Taking the production efficiency into account, attention is directed to a method of obtaining a plurality of optical elements in one heating cycle, i.e., a multi-product batch process. As far as the heating cycle is essential and requires a predetermined time period, the productivity can be improved if a plurality of optical elements are simultaneously produced in the heating cycle.

In the meanwhile, one of design options for the mother mold capable of simultaneously producing a plurality of optical elements is to dispose a plurality of molding surfaces in a single-line arrangement (JP 11-29333 A mentioned above). Such single-line arrangement is advantageous in the following respects. That is, the structure of the mother mold is simple. In particular, consideration will be made of supply of the glass materials to the mother mold. In the state where the glass materials are arranged in a single line, a supplying member is split by a straight line into two parts to drop the glass materials through a gap between the two parts. With such a simple mechanism, the glass materials are simultaneously supplied onto the mother mold (i.e., to the respective molding surfaces).

In order to drop the glass material in a heated and softened state, the glass material in the softened state is floated on a floating saucer by the use of a gas and then dropped and supplied to the mother mold. This technique is advantageous in that the glass material is stably supplied without damaging the surface of the glass material. For example, by arranging a plurality of floating saucers in a single line and splitting each floating saucer into two parts, the glass materials are simultaneously dropped through gaps between the two parts onto the molding surfaces arranged in a single line. In this case, the apparatus is relatively simple in structure.

Thereafter, press molding can be immediately performed before the temperature of the glass material is changed from the preheat temperature. The above-mentioned technique is very advantageous in that the productivity is high and a plurality of optical elements can be stably and accurately produced under a thermally uniform condition.

As described above, the linear arrangement of the molding surfaces on the mother mold is advantageous. However, such design of the mother mold is disadvantageous in the following respects.

If the mother mold having an elongated shape is provided with a plurality of molding surfaces arranged in a single line and if the mother mold is warped or deformed due to temperature difference in its thickness direction, upper and lower molding surfaces are inclined. The effect of such inclination is greater towards opposite ends of the mother mold in its longitudinal direction. This results in occurrence of tilt in molded products, such as optical lenses, and thickness deviation of the formed products. The tilt and the thickness deviation are greater in those products formed by the molding surfaces nearer to the opposite ends of the mother mold. Recently, the problem of warp of the mother mold becomes more and more serious. This is because, following the recent demand for reduction in cycle time of the press molding process, rapid heating and rapid cooling are carried out. In addition, following the recent demand for simultaneous production of a greater number of products, the mother mold is further elongated.

One of the main factors causing the warp is a temperature gradient produced in the mother mold, in particular, a temperature gradient in the vertical direction. In case where the molding surfaces are arranged in series in a single line, the tilt and the thickness deviation become more and more serious under a greater influence of warp of the mother mold as a greater number of molding surfaces are arranged on the mother mold and as the molding surfaces are arranged nearer to the opposite ends of the mother mold.

For example, FIG. 1 shows a basic structure of a typical press molding apparatus of the type mentioned above. The press molding apparatus illustrated in FIG. 1 has a pressing mold comprising an upper mother mold 502 and a lower mother mold 504. Each of the upper and the lower mother molds 502 and 504 has an elongated shape extending in a transversal or horizontal direction in the figure. The upper and the lower mother molds 502 and 504 are supported by upper and lower supporting members 506 and 508, respectively. The upper supporting member 506 is attached to a fixed shaft 510 while the lower supporting member 508 is attached to a drive shaft 512 of a motor mechanism or the like. The upper and the lower mother molds 502 and 504 have a plurality of molding portions 514 and 516 formed on confronting surfaces thereof, respectively, to provide preforms with a lens shape. To a position between the upper and the lower mother molds 502 and 504, the preforms each of which is preliminarily formed into a desired provisional shape are transferred after heated by a heating unit (not shown) to a predetermined temperature, for example, to a temperature corresponding to a viscosity between $10^{5.6}$ and $10^9$ poises. The upper and the lower mother molds 502 and 504 are surrounded by induction heating coils 518 and 520 for heating the upper and the lower mother molds 502 and 504, respectively. The upper and the lower mother molds 502 and 504, which are preliminarily heated, clamp and press the preforms in a softened state to thereby form high-accuracy processed surfaces on the preforms.

Herein, temperature distribution is caused in the upper and the lower mother molds 502 and 504 in their thickness directions. This is because the heat of the upper and the lower mother molds 502 and 504 is dissipated through the supporting members 506 and 508, respectively. Such temperature difference may possibly results in occurrence of the warp in the upper and the lower mother molds 502 and 504 as schematically depicted by dot-dot-dash lines in FIG. 1. If press molding is performed in the state where the upper and the lower molds are warped, defective molding may be caused and the upper or the lower mother mold 502 or 504 may be damaged. If the degree of parallelism is decreased due to the warp, upper and lower surfaces of press formed products will be inclined. If the required product specification is strict, a desired performance may not be achieved.

In particular, it is recently proposed to further increase the lengths of the upper and the lower mother molds 502 and 504 so as to simultaneously form a greater number of (for example, six) preforms for the purpose of improving the production efficiency and to form lenses having greater diameters. Under the circumstances, it is an urgent demand to suppress the warp.

SUMMARY OF THE INVENTION

It is therefore an object of this invention to provide a press molding apparatus and a press molding method, which are capable of improving the dimensional accuracy of an optical element by suppressing the warp of a mother mold.

It is another object of this invention to provide an apparatus and a method for producing a glass optical element, which are capable of obtaining a high-accuracy optical element with high productivity and without product variation even if grinding or polishing is not carried out after molding.

According to this invention, there is provided a press molding apparatus for simultaneously press molding a plurality of materials into a plurality of optical elements, comprising at least one upper mother mold and at least one lower mother mold, each having a shape extending in a direction; a plurality of upper molding surfaces and a plurality of lower molding surfaces aligned on the at least one upper mother mold and the at least one lower mother mold, respectively, in the direction; a heater for heating the upper and/or the lower mother molds; upper and lower supporting members each for supporting the at least one upper mother mold and the at least one lower mother molds so that the upper molding surfaces and the lower molding surfaces are faced to each other; and a drive shaft coupled to the upper supporting member or the lower supporting member so that the upper mother mold or the lower mother mold move towards and away from each other for press molding; wherein each of the upper and the lower mother molds satisfies the relationship given by:

$$L \times \alpha \times \Delta T / t < 0.0008, \tag{1}$$

where L represents the length (mm) of the mother mold in the direction, t, the thickness (mm) of the mother mold, $\alpha$, the thermal expansion coefficient (/° C.) of the mother mold, and $\Delta T$, the temperature difference (° C.) produced between both ends in the thickness direction of the mother mold during the press molding.

With the above-mentioned structure, the mother mold having an elongated shape can be prevented from being warped. It is consequently possible to improve the dimensional accuracy of the optical elements formed by the molding surfaces, to suppress the tilt, and to improve the accuracy of the lens thickness.

Preferably, the press molding apparatus further comprises a plurality of the upper mother molds and a plurality of the lower mother molds. The plurality of the upper and the lower molding surfaces are aligned on the plurality of the upper mother molds and the plurality of the lower mother molds in the direction.

Preferably, the heater comprises a single induction heating coil surrounding the at least one upper mother mold or the at least one lower mother mold.

Preferably, in case where a plurality of the mother dies are disposed so that the molding surfaces are arranged in a single line, each of the mother dies has a supporting shaft.

Preferably, the press molding apparatus further comprises a pressing mold set comprising a plurality of the upper mother molds and a plurality of the lower mother molds disposed so that the upper molding surfaces and the lower molding surfaces are aligned in the direction; and a plurality of support shafts each supporting each of the upper mother molds and the lower mother molds of the pressing mold set. The upper mother mold and/or the lower mother molds are moved by the drive shaft through the supporting shafts to move towards and away from each other.

As described above, the pressing mold set preferably comprising a plurality of upper and the lower mother molds is collectively heated by the heater and the upper and the lower mother molds are supported by the individual supporting shafts, respectively. With this structure, even in case where a plurality of materials are simultaneously press molded, the optical elements excellent in dimensional accuracy can be obtained. This is because the distances between the molding surfaces and the supporting shafts can be kept substantially smaller, when compared with the single mother mold having many molding surfaces in a line and a single supporting shaft, and the temperature distributions in the upper and the lower mother molds can be kept uniform, thereby keeping the uniform press conditions at the respective molding surfaces. Even in case where the optical elements are simultaneously obtained by press molding by the use of the upper and the lower mother molds having a plurality of molding surfaces adapted to form the optical elements having a diameter of 10 mm or more, the optical elements excellent in dimensional accuracy can be obtained. Furthermore, since the upper and the lower mother molds are supported by the individual supporting shafts, the press conditions by the upper and the lower mother molds can be kept substantially uniform. In addition, since the pressing mold set comprises a plurality of the upper and the lower mother molds, each individual mother mold can be reduced in length. Therefore, even when a plurality of objects are simultaneously obtained by press molding or even when a plurality of optical elements having a medium aperture size or more are simultaneously obtained by press molding, it is possible to suppress the warp of the upper and the lower mother molds due to the heat.

Preferably, each of the upper mother molds and each of the lower mother molds of the pressing mold set have a plurality of the upper molding surfaces and the lower molding surfaces, respectively.

Preferably, the press molding apparatus further comprises an induction heating coil surrounding the pressing mold set to collectively heat the upper and the lower mother molds by induction heating. The upper and the lower mother molds have rounded corners on sides adjacent to each other.

Preferably, the drive shaft has a center axis substantially coincident with the center of the pressing mold set in its longitudinal direction.

According to this invention, there is also provided a press molding method for obtaining a plurality of optical elements by simultaneously press molding a plurality of materials, comprising the steps of preparing a molding apparatus comprising at least one upper mother mold and at least one lower mother mold, each having a shape extending in a direction, a plurality of upper molding surfaces and a plurality of lower molding surfaces being aligned on the at least one upper mother mold and the at least one lower mother mold, respectively, in the direction, and the upper molding surfaces and the lower molding surfaces being faced to each other; heating the upper and the lower mother molds; and press molding the materials with the upper and the lower molding surfaces by driving the upper or the lower mother mold, wherein each of the upper and the lower mother molds satisfies the relationship given by:

$$L \times \alpha \times \Delta T/t < 0.0008, \quad (1)$$

where L represents the length (mm) of the mother mold in the direction, t, the thickness (mm) of the mother mold, $\alpha$, the thermal expansion coefficient (/° C.) of the mother mold, and $\Delta T$, the temperature difference (° C.) produced between both ends in the thickness direction of the mother mold during the press molding.

Preferably, the press molding apparatus comprises a plurality of the upper mother molds and a plurality of the lower mother molds The plurality of the upper molding surfaces and the lower molding surfaces are aligned on the plurality of the upper mother molds and a plurality of the lower mother molds, respectively, in the direction.

Preferably, the heating is carried out by a single induction heating coil surrounding at least one of the upper or the lower mother molds.

Preferably, the press molding apparatus comprises a pressing mold set comprising a plurality of the upper mother molds and a plurality of the lower mother molds disposed so that the upper molding surfaces and the lower molding surfaces are aligned in the direction. The press molding is carried out by press molding the materials with the upper and the lower molding surfaces by driving the upper mother molds or the lower mother molds, each of the upper mother molds and the lower mother molds being supported by a support shaft.

Preferably, the materials are heated to a temperature higher than that of the upper and the lower mother molds and softened before the materials are supplied to the molding surfaces.

Preferably, the materials are glass materials which are heated to a temperature corresponding to the viscosity not higher than $10^9$ poises before the materials are supplied to the molding surfaces.

Other objects of this invention will become clear as the description proceeds.

DESCRIPTION OF THE PREFERRED EMBODIMENTS

Figure 1:
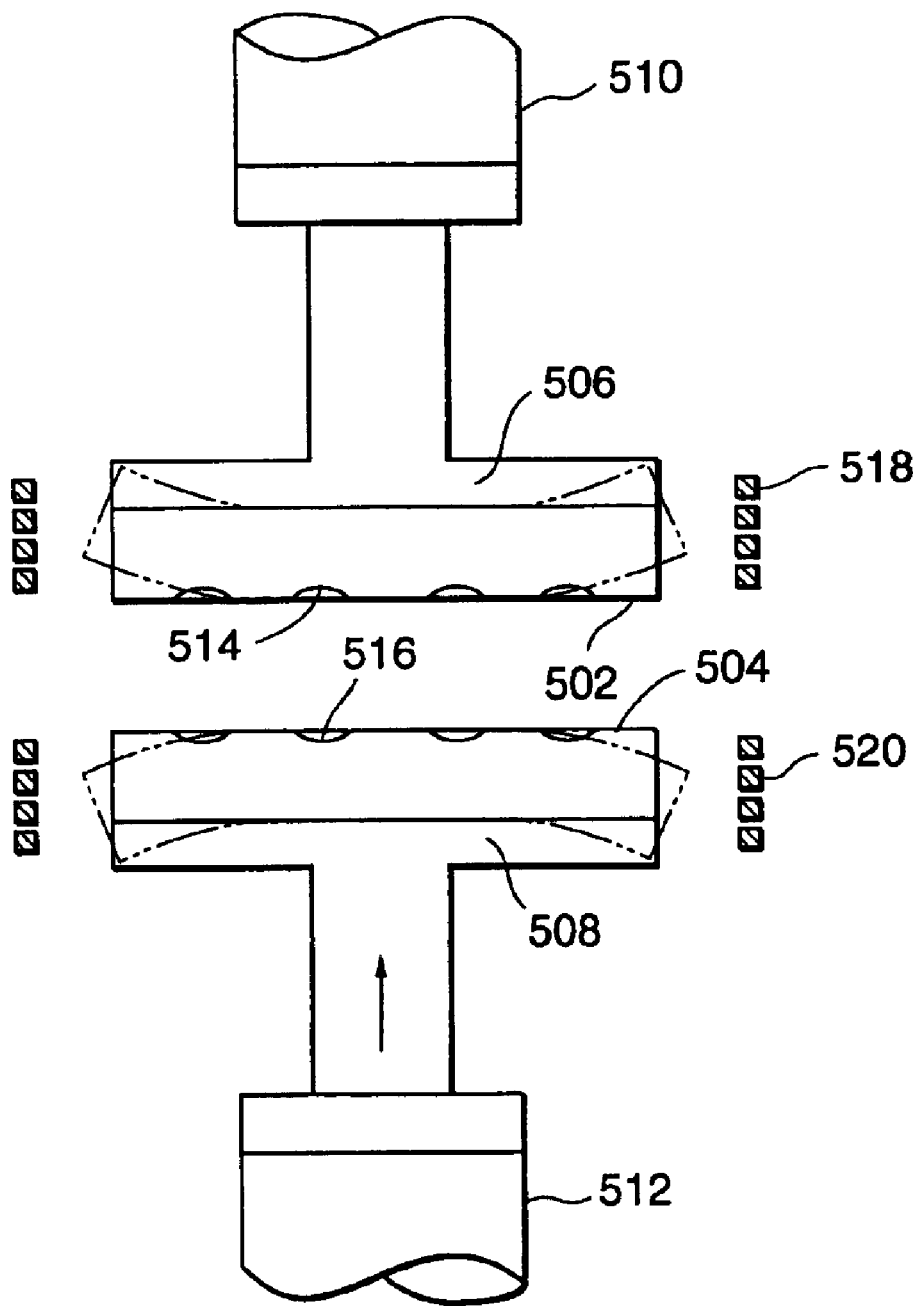
FIG. 1 shows an existing press molding apparatus.

Now, preferred embodiments of this invention will be described in detail with reference to the drawing.

Figure 2:
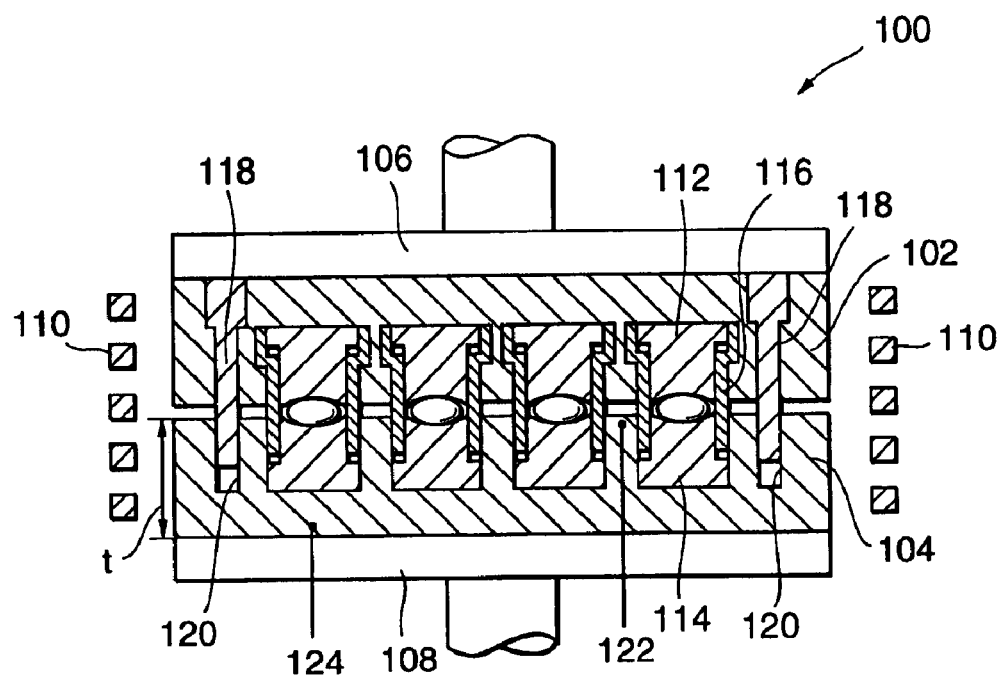
FIG. 2 shows a press molding apparatus according to a first embodiment of this invention.

At first referring to FIG. 2, a press molding apparatus 100 according to a first embodiment of this invention will be described. The press molding apparatus 100 is used to produce an optical lens having a predetermined shape by press molding a preform prepared by preliminarily forming a glass material into a flat spherical shape.

The press molding apparatus 100 comprises an upper mother mold 102 and a lower mother mold 104 arranged at upper and lower positions and faced to each other. Each of the upper and the lower mother molds 102 and 104 is made of a tungsten alloy and has an elongated shape extending in the transversal or horizontal direction in the figure.

The upper mother mold 102 has four upper mold members 112 arranged in a single line. Similarly, the lower mother mold 104 has four lower mold members 114 arranged in a single line and faced to the upper mold members 112 of the upper mother mold 102, respectively. The upper mold members 112 have lower surfaces as molding surfaces for pressing the preforms while the lower mold members 114 have upper surfaces as molding surfaces for pressing the preforms. The lower mother mold 104 is attached to a lower supporting member 108 driven in the vertical direction. The upper mother mold 102 is attached to an upper supporting member 106 as a fixed member. The upper and the lower mother molds 102 and 104 are surrounded by an induction heating coil 110 for high-frequency induction heating. The induction heating coil 110 is wound in a generally elliptical shape substantially along the outer contour or periphery of the upper and the lower mother molds 102 and 104.

Each of the upper mold members 112 is provided with a sleeve 116 formed at its outer periphery. The sleeve 116 is fitted to the lower mold member 114 with a small clearance to be slidable therealong and serves to prevent axial offset between upper and lower surfaces of an optical lens. The upper mother mold 102 is provided with guide pins 118 protruding therefrom while the lower mother mold 104 is provided with guide holes 120 to be engaged with the guide pins 118. Each of the upper mold members 112, the lower mold members 114, and the sleeves 116 is made of sintered silicon carbide with silicon carbide deposited thereon by CVD.

Figure 3:
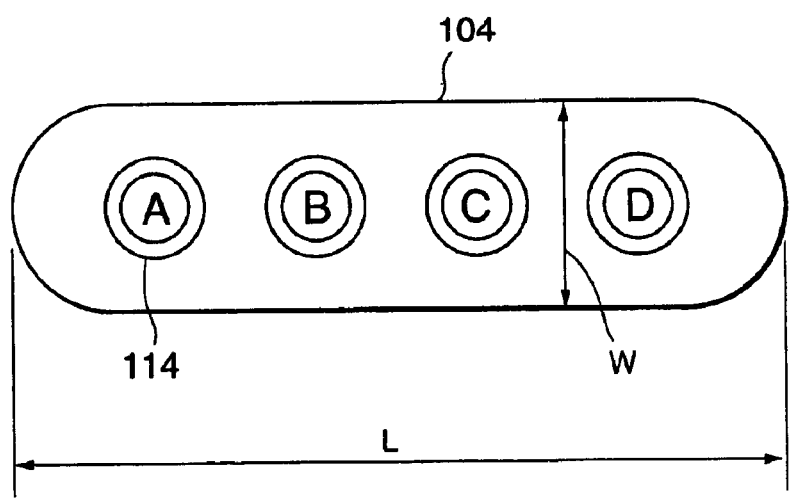
FIG. 3 is a plan view of a lower mother mold in FIG. 2.

Referring to FIG. 3, the lower mother mold 104 has a generally elliptical shape with longitudinal opposite ends rounded. The four molding surfaces A, B, C, and D (the upper surfaces of the lower mold members 114) are arranged at equal intervals in a single line along the longitudinal direction of the lower mother mold 104. Although not shown in the figure, the upper mother mold 102 is similar in shape in plan view to the lower mother mold 104.

In this embodiment, the upper mother mold 102 satisfies the relationship given by:

$$L \times \alpha \times \Delta T/t < 0.0008, \quad (1)$$

where L represents the length (mm), t, the thickness (mm), $\alpha$, the thermal expansion coefficient (/° C.), and $\Delta T$, the temperature difference (° C.) produced between both ends in the thickness direction of the upper mother mold 102 during press molding.

Likewise, the lower mother mold 104 satisfies the above-mentioned relationship given by the formula (1) with respect to the length L, the thickness t, the thermal expansion coefficient α, and the temperature difference ΔT produced between both ends in the thickness direction of the lower mother mold 104 during press molding.

When each of the upper and the lower mother molds 102 and 104 satisfies the above-mentioned relationship given by the formula (1), the warp of the upper and the lower mother molds 102 and 104 during press molding can be suppressed.

Figure 4B:
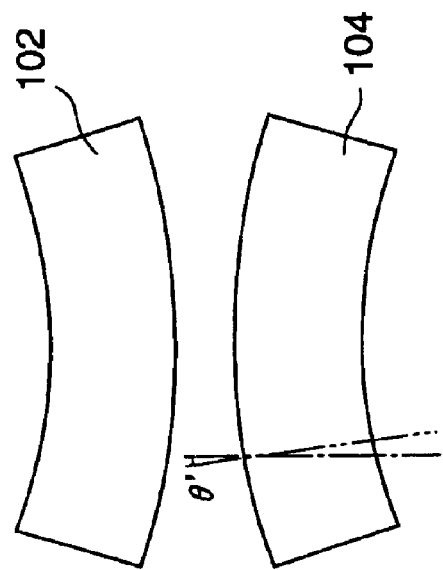
FIGS. 4A and 4B are views for describing the effect of this invention.
Figure 4A:
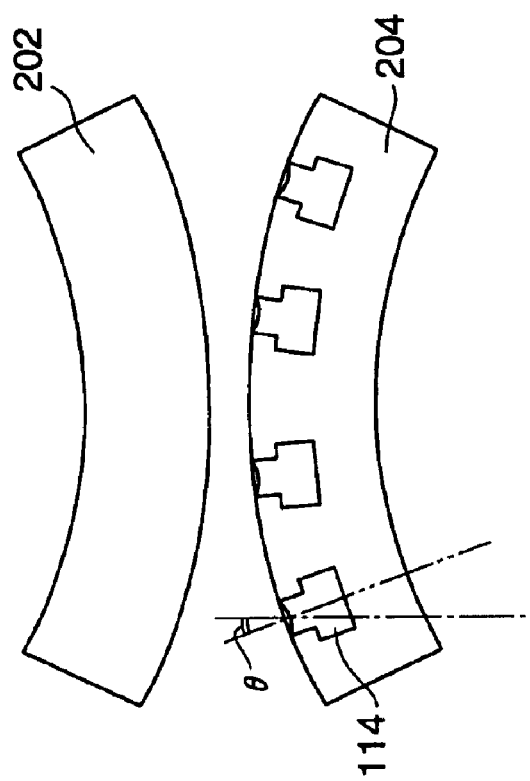

Referring to FIGS. 4A and 4B, description will be made of the effect achieved by suppressing the warp of the upper and the lower mother molds 102 and 104. As illustrated in FIG. 4A, each of upper and lower mother molds 202 and 204 are heavily warped. As the warp is increased, molding surfaces (upper surfaces of lower mold members 114 in the illustrated example) located at longitudinal opposite ends of each mother mold have greater inclination angles θ. Furthermore, the distance between the upper and the lower molding surfaces is slightly increased towards the longitudinal opposite ends. On the other hand, referring to FIG. 4B, the inclination angle θ' of the molding surface is minimized in this embodiment by suppressing the warp of the upper and the lower mother molds 102 and 104. It is therefore possible to improve the dimensional accuracy of optical lenses obtained by press molding. Thus, in case where the inclination angle θ is excessively large as illustrated in FIG. 4A as a result of a single-line arrangement of the molding surfaces of the mother mold, the length L of the mother mold is reduced so that the inclination angle θ' becomes small as illustrated in FIG. 4B. In order to simultaneously obtain a large number of optical elements by press molding with the mother mold reduced in length, a plurality of mother molds are used and disposed so that the molding surfaces are arranged in a single line as illustrated in FIG. 5.

Figure 5:
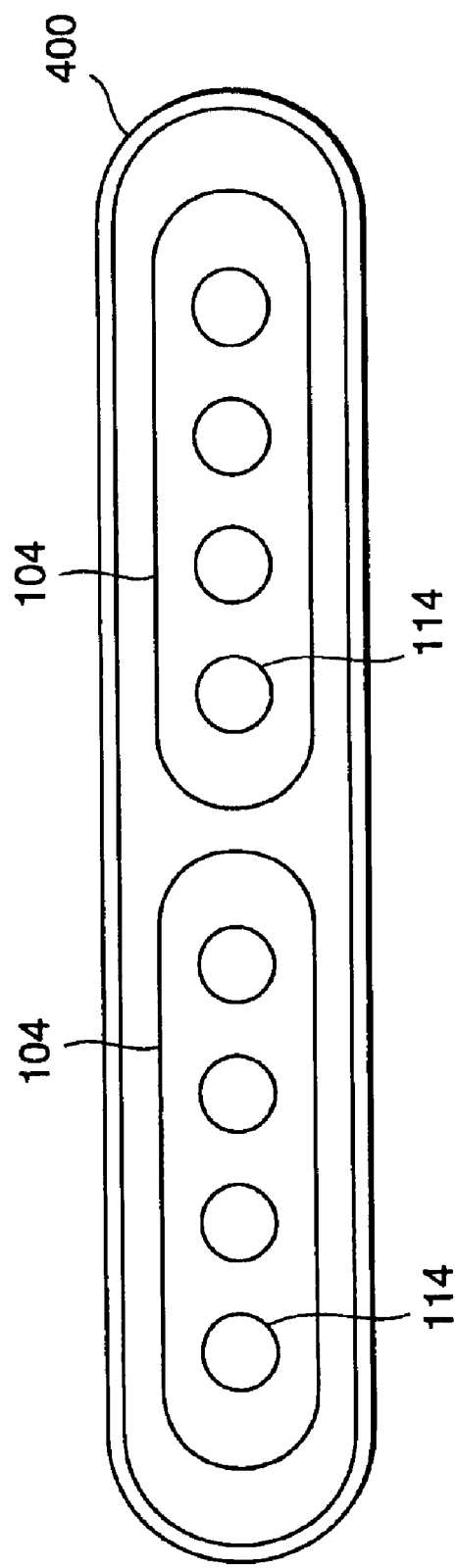
FIG. 5 shows a press molding apparatus as a modification of the first embodiment.

Referring to FIG. 5, description will be made of a press molding apparatus as a modification of the first embodiment. The press molding apparatus comprises two sets of the upper and the lower mother molds 102 and 104 illustrated in FIG. 2. FIG. 5 shows the arrangement of the lower mother molds 104 in plan view. In the press molding apparatus, the two lower mother molds 104 are disposed in the manner such that the lower mold members 114 are arranged in a single line. Although not shown in the figure, the two upper mother molds 102 are disposed in the manner similar to the lower mother molds 104 (i.e., in the manner such that the upper mold members 112 are arranged in a single line). A heating coil 400 surrounds the two upper mother molds 102 (not illustrated in FIG. 5) and the two lower mother molds 104 to simultaneously heat the upper and the lower mother molds 102 and 104 by high-frequency induction heating. In this modification, it is possible to press mold a large number of preforms and to suppress the warp of each of the upper and the lower mother molds 102 and 104 by satisfying the above-mentioned formula (1). It is noted here that three or more sets of the upper and the lower mother molds 102 and 104 may be provided. By the use of a plurality of the upper and the lower mother molds, the warp of the upper and the lower mother molds is not increased even if the number of the molding surfaces is increased. As a consequence, it is possible to simultaneously obtain a large number of optical elements excellent in dimensional accuracy and thickness accuracy.

Figure 6:
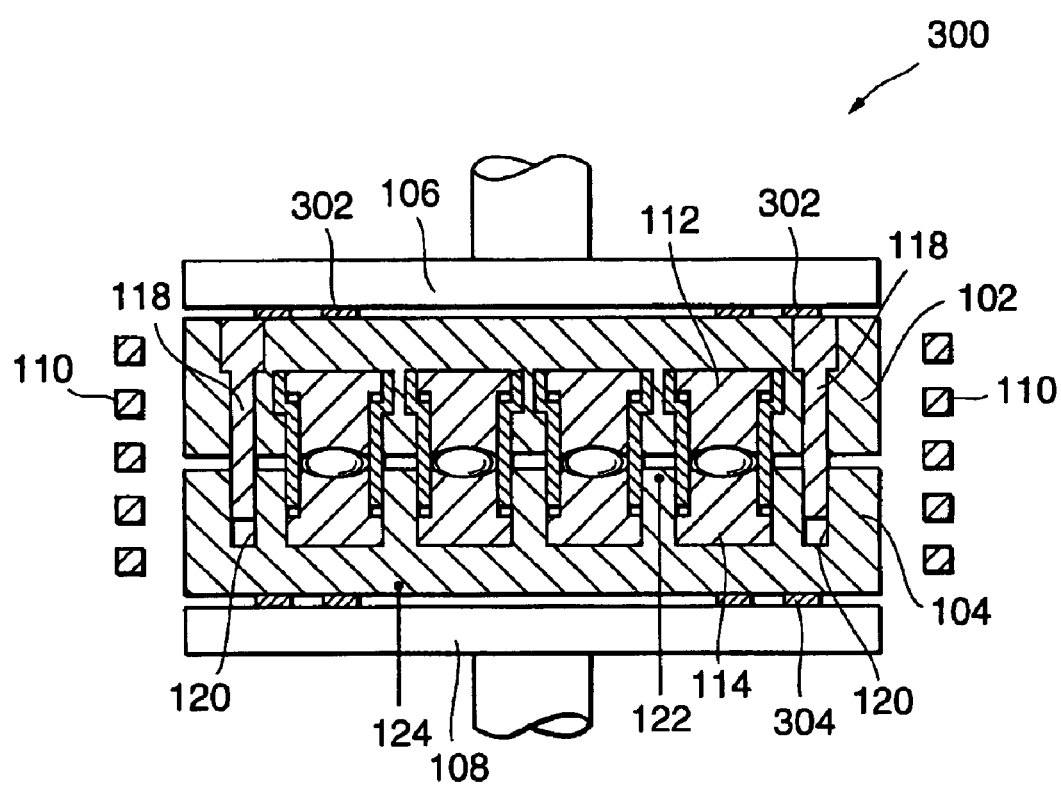
FIG. 6 shows a press molding apparatus according to a second embodiment of this invention.

Referring to FIG. 6, description will be made of a press molding apparatus 300 according to a second embodiment of this invention. In the press molding apparatus 300, a gap is formed between the upper mother mold 102 and the upper supporting member 106 and a plurality of spacers 302 are inserted into the gap. Likewise, a gap is formed between the lower mother mold 104 and the lower supporting member 108 and a plurality of spacers 304 are inserted into the gap. The presence of the gaps contributes to suppress dissipation of the heat of the upper and the lower mother molds 102 and 104 through the upper and the lower supporting members 106 and 108. With this structure, ΔT in the formula (1) is suppressed. Except that the gaps are formed as mentioned above, the press molding apparatus 300 is similar in structure to the press molding apparatus 100 according to the first embodiment. Thus, in this embodiment also, each of the upper and the lower mother molds 102 and 104 satisfies the above-mentioned formula (1). In order to suppress ΔT, the supporting shaft may be made of a heat resistant material or the supporting shaft may be reduced in sectional area.

The above-mentioned modification (FIG. 5) may be applied to the press molding apparatus 300 according to the second embodiment. Furthermore, the mother mold may be made of a material having a relatively small thermal expansion coefficient α. The thickness t of the mother mold may be appropriately controlled. In any event, by satisfying the formula (1), it is possible to stably and uniformly produce optical elements having sufficient accuracy.

Figure 7:
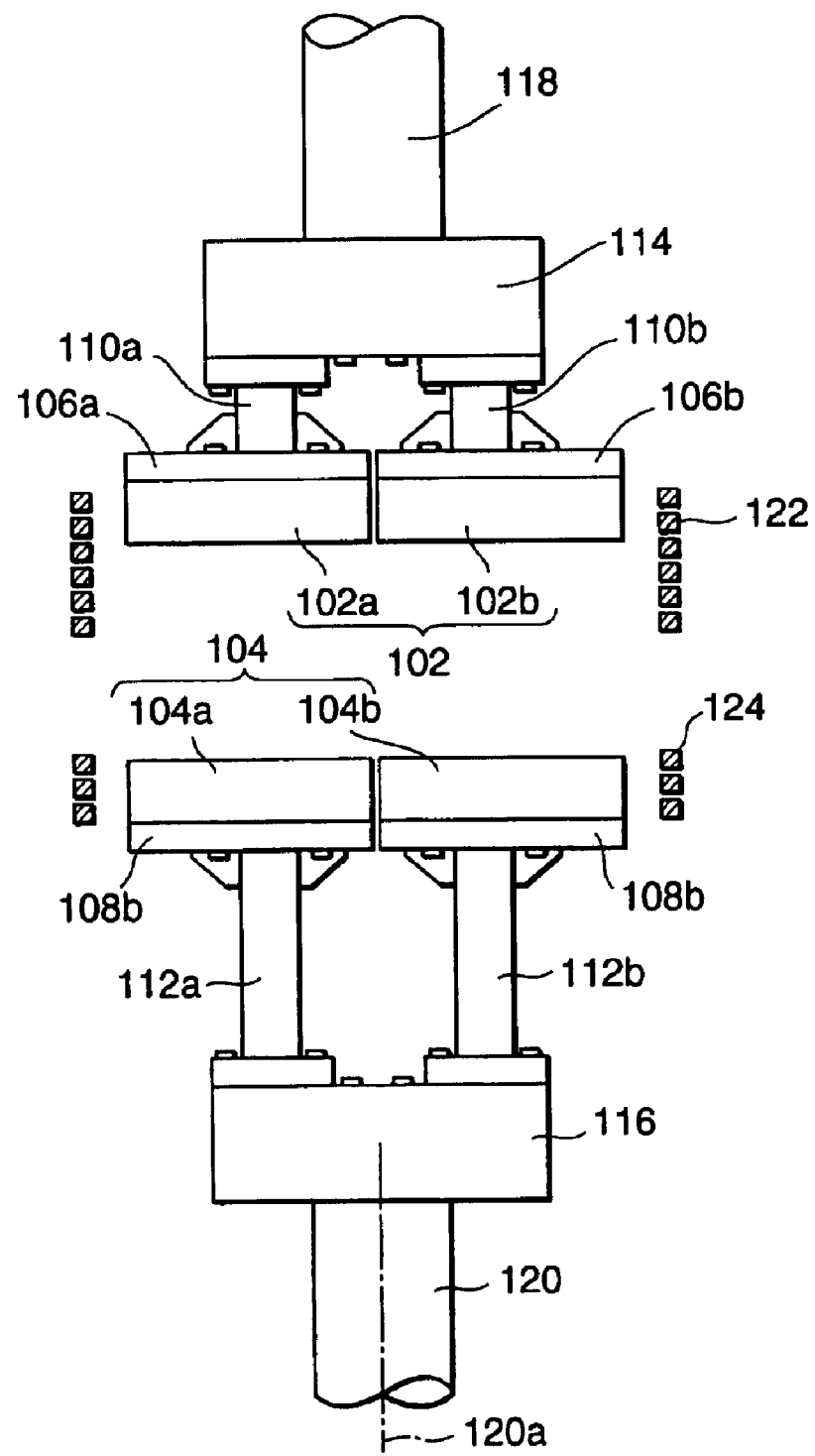
FIG. 7 shows a press molding apparatus according to a third embodiment of this invention.
Figure 8:
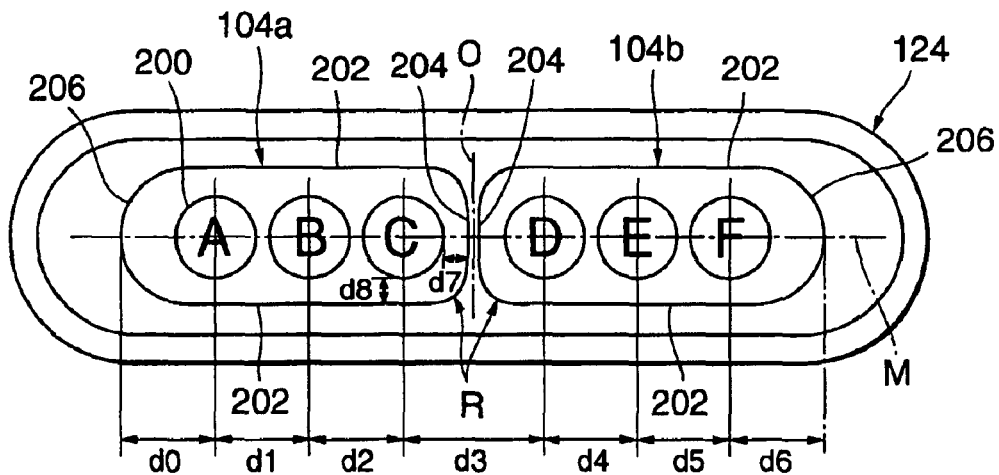
FIG. 8 shows lower mother molds in FIG. 7.

Referring to FIGS. 7 and 8, description will be made of a press molding apparatus according to a third embodiment of this invention. For example, the press molding apparatus is used to produce a medium-aperture lens having a diameter of 17 mm by the use of a preform as a material to be press molded. The preform is prepared by preliminarily forming a glass material into a flat spherical shape. As illustrated in FIG. 7, the press molding apparatus comprises a pressing mold set including an upper mold 102 and a lower mold 104. Each of the upper and the lower molds 102 and 104 has an elongated shape extending in the transversal or horizontal direction in the figure and is made of, for example, a tungsten alloy. The upper and the lower molds 102 and 104 are surrounded by induction heating coils 122 and 124, respectively. The induction heating coils 122 and 124 serve to heat the upper and the lower molds 102 and 104 by high-frequency induction heating, respectively.

The upper mold 102 comprises a pair of left and right upper mother molds 102a and 102b. The lower mold 104 comprises a pair of left and right mother molds 104a and 104b. The upper mother molds 102a and 102b are faced to the lower mother molds 104a and 104b in the vertical direction, respectively. The upper mother molds 102a and 102b have upper surfaces fixed to a pair of supporting plates 106a and 106b, respectively. The supporting plates 106a and 106b have upper surfaces attached to upper supporting shafts 110a and 110b, respectively. The upper supporting shafts 110a and 110b are attached to a fixed shaft 118 through a common base 114. On the other hand, the lower mother molds 104a and 104b have lower surfaces fixed to a pair of supporting plates 108a and 108b, respectively. The supporting plates 108a and 108b have lower surfaces attached to lower supporting shafts 112a and 112b, respectively. The lower supporting shafts 112a and 112b are attached to a drive shaft 120 through a common base 116. The drive shaft 120 is driven by a driving mechanism having an AC servo motor to linearly move in the vertical direction. The drive shaft 120 has a center axis 120a coincident with the center of each of the upper and the lower molds 102 and 104 in the longitudinal direction. When the drive shaft 120 moves in the vertical direction, the upper and the lower molds 102 and 104 are opened and closed.

Referring to FIG. 8, the lower mold 104 (lower mother molds 104a, 104b) and the induction heating coil 124 therearound are shown in plan view as seen from the above. The upper mold 102 (upper mother molds 102a, 102b) is similar in shape in plan view to the lower mold 104 and is not illustrated in the figure. The lower mother molds 104a and 104b are symmetrical in shape with respect to a center position O in the longitudinal direction of the lower mold 104. The lower mother mold 104a has a pair of long sides 202 extending in the longitudinal direction, an inner short side 204 perpendicular to the long sides 202 (and nearest to the center position O), and an outer short side 206 faced to the inner short side 204 (and farthest from the center position O). The outer short side 206 defines an arc of a half circle having a radius equal to a half of the distance between the two long sides 202 (i.e., the width of the lower mother mold 104a). The other lower mother mold 104b is symmetrical in shape with the lower mother mold 104a with respect to the center position O. Preferably, a gap of 0.5–3 mm is formed between the inner short sides 204 of the lower mother molds 104a and 104b.

The induction heating coil 124 is wound around both of the lower mother molds 104a and 104b in a shape corresponding to an outer periphery of the lower mother molds 104a and 104b. The induction heating coil 122 around the upper mother molds 102a and 102b is similar in shape in plan view to the induction heating coil 124.

The lower mother mold 104a has an upper surface provided with three molding portions 200 for imparting a glass product shape to preforms. Likewise, the lower mother mold 104b has an upper surface provided with three molding portions 200. These six molding portions 200 are arranged in a single line on a center line M defining the center of the lower mother molds 104a and 104b in the widthwise direction. The six molding portions 200 have preform pressing surfaces as molding surfaces A, B, C, D, E, and F, respectively.

Each of the lower mother molds 104a and 104b has a shape with rounded corners on an adjacent side at which the lower mother molds 104a and 104b are adjacent to each other. This is because an angled portion is excessively elevated in temperature under high-frequency induction heating. By rounding these corners, temperature distribution in each of the lower mother molds 104a and 104b is kept uniform. Specifically, each of the corners between the inner short side 204 and the long sides 202 in each of the lower mother molds 104a and 104b has a curve R. Instead of the curve R, the corners may be chamfered. Alternatively, the inner short sides 204 on the adjacent sides of the lower mother molds 104a and 104b may have a curved shape.

Description will be made of the arrangement of the molding surfaces A to F in each of the lower mother molds 104a and 104b. The interval (arrangement pitch) d1 between the molding surfaces A and B, the interval d2 between the molding surfaces B and C, the interval d4 between the molding surfaces D and E, and the interval d5 between the molding surfaces E and F are substantially equal to one another. In addition, the interval d0 between the molding surface A and the outer short side 206 and the interval d6 between the molding surface F and the outer short side 206 are equal to the above-mentioned interval (d1 et al). On the other hand, the interval d3 between the molding surfaces C and D adjacent to each other with the center position O interposed therebetween is greater than the above-mentioned interval (d1 et al). The shortest distance d7 from the molding surface C to the inner short side 204 is substantially equal to the shortest distance d8 from the molding surface C to the long side 202. Likewise, the shortest distance from the molding surface D to the inner short side 204 is substantially equal to the shortest distance from the molding surface D to the long side 202. The above-mentioned relationship of d0 to d8 is determined in order to minimize the temperature difference in the molding surfaces A to F during high-frequency induction heating.

The position of the lower supporting shaft 112a (FIG. 7) in the horizontal plane corresponds to the center position (i.e., the molding surface B) of the molding surfaces A to C of the lower mother mold 104a in its alignment direction. Likewise, the position of the lower supporting shaft 112b (FIG. 7) in the horizontal plane corresponds to the center position (i.e., the molding surface E) of the molding surfaces D to F of the lower mother mold 104b in its alignment direction. With this structure, the pressure is uniformly applied to the preforms on the molding surfaces A to F. Similarly, the positions of the upper supporting shafts 110a and 110b in the horizontal plane correspond to the center positions of the upper mother molds 102a and 102b, respectively.

Each of the lower mother molds 104a and 104b has an inner region near to the center position O. In the inner region, the temperature is easily elevated as compared with the remaining region. Therefore, it is preferable to provide an air cooling unit for locally cooling the above-mentioned inner region, thereby achieving uniform temperature distribution in the lower mother molds 104a and 104b. Preferably, a similar cooling unit is provided for the upper mother molds 102a and 102b.

Next, description will be made of specific examples of the above-mentioned embodiments.

At first, as examples 1 to 4, a biconvex lens having a diameter of 6.6 mm was produced by the use of the press molding apparatus 100 (FIG. 2) according to the first embodiment. In the examples 1 to 4, the length L, the thickness t, the width W, the thermal expansion coefficient α, the temperature difference ΔT between both ends in the thickness direction of the mother molds 102 and 104 in the press molding apparatus 100 were varied as shown in Table 1 (will later be given). In the examples 1–3 and the example 4, the mother molds 102 and 104 were made of tungsten alloys different in thermal expansion coefficient from each other.

Use was made of flat spherical glass preforms (each having the weight of 54 mg) of barium borosilicate glass (having a transition point of 514° C. and a sagging point of 545° C.). The glass preforms were supplied to four floating saucers on a support arm (not shown) and floated up by a gas to be supported in a floating state. The glass preforms in this state were placed in a heating chamber (not shown) together with the supporting member. The heating chamber was kept at an atmosphere of 700° C. by PYROMAX (PX-DS). The four glass preforms were collectively rapidly heated in the heating chamber for a predetermined time period in conformity with a molding cycle speed of the optical glass elements until the glass preforms were heated to about 596° C. (corresponding to $10^8$ poises). On the other hand, the four molding surfaces were preheated by heating mother molds to about 550° C. (corresponding to $10^{10.2}$ poises of the glass preforms)+3° C. Thereafter, the support arm was placed at a position directly above the lower mother molds 104. By quickly opening the support arm, the floating saucers were split to simultaneously drop and transfer the preforms from the floating saucers to the molding surfaces of the lower mother mold 104, respectively. Then, the support arm was immediately retreated from the position directly above the lower mother mold 104. High-frequency power was interrupted. The lower mother mold was moved upward and pressing was carried out under the pressure of 60 kg/cm². The lenses were cooled down to 470° C. under the pressure applied by the weight of the mold member 112 alone. Thereafter, the lower mother mold 104 was moved downward to separate or part the upper and the lower mother molds 102 and 104 from each other. By the use of a suction pad (not shown), the lenses were removed. The cycle time of the press molding process depends upon the ability of a high-frequency power supply and the size of the mother mold (heat capacity), etc. When the mother mold having the length of 190 mm was used, the cycle time was equal to 180 seconds. When the mother mold having the length of 112 mm was used, the cycle time was 110 seconds.

For the optical lenses obtained by press molding as mentioned above, tilt were measured. The measurement was carried out for those optical lenses formed by the endmost molding surface (the molding surface A or D in FIG. 3) among the four molding surfaces. Specifically, the edge thickness of the optical lens was measured by a micrometer. The tilt were calculated from the maximum value and the minimum value of the edge thickness and the lens diameter. The results of measurement are shown in Table 1.

TABLE 1

| Example | t (mm) | L (mm) | W (mm) | α (10 − 7/° C.) | ΔT (° C.) | L·α·ΔT/t | tilt (min) |
|---------|--------|--------|--------|-----------------|-----------|----------|------------|
| 1 | 30 | 112 | 37 | 52 | 41 | 0.000796 | 1.8 |
| 2 | 30 | 190 | 40 | 52 | 36 | 0.001186 | 3.2 |
| 3 | 25 | 190 | 40 | 52 | 35 | 0.001383 | 4.1 |
| 4 | 30 | 112 | 37 | 64 | 42 | 0.001004 | 2.3 |
| 5 | 30 | 190 | 40 | 52 | 18 | 0.000593 | 1.4 |
| 6 | 30 | 132 | 48 | 52 | 20 | 0.000458 | 0.9 |
| 7 | 30 | 112 | 37 | 64 | 30 | 0.000672 | 1.8 |

Figure 9:
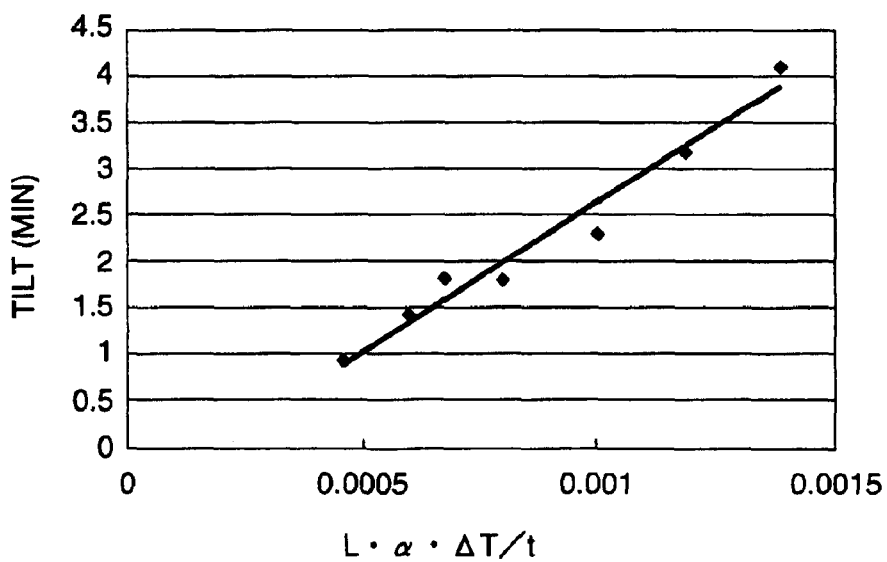
FIG. 9 is a graph showing the result of measurement of tilt.

On the other hand, as examples 5–7, a biconvex lens having a diameter of 6.6 mm was formed by pressing barium borosilicate glass using the press molding apparatus 300 (FIG. 6) according to the second embodiment. In the examples 5 to 7, the length L, the thickness t, the width W, the thermal expansion coefficient α, the temperature difference ΔT between both ends in the thickness direction of the mother molds 102 and 104 were varied as shown in Table 1. In the examples 5, 6 and the example 7, the mother molds 102 and 104 were made of tungsten alloys different in thermal expansion coefficient from each other. The press molding technique actually used was similar to that used in the examples 1–4. For the optical lenses obtained by press molding, tilt was measured. The results of measurement is shown in Table 1. Based on the results of measurement, L·α·ΔT/t was calculated for each of the examples 1 to 7. FIG. 9 shows the relationship between the values of L·α·ΔT/t and the tilt.

As will be understood from FIG. 9, L·α·ΔT/t is substantially proportional to the tilt. As L·α·ΔT/t is smaller, the tilt is smaller. Generally, the allowance of the tilt in the optical lens is within two minutes. From FIG. 9, it is understood that L·α·ΔT/t is not greater than 0.0008 in order to suppress the tilt to two minutes or less.

As seen from Table 1, the tilt is smaller in the examples 5 to 7 than in the examples 1 to 4. Presumably, this is because the presence of the gaps between the mother molds 102 and 104 and the supporting members 106 to 108 suppresses the heat conduction from the mother molds to the supporting members and the temperature difference ΔT (to thereby suppress L·α·ΔT/t).

As described above, in the press molding apparatus in each of the foregoing embodiments, the mother molds 102 and 104 satisfy the condition of L·α·ΔT/t not greater than 0.0008. Therefore, it is possible to suppress the warp of the mother molds 102 and 104 during press molding and to thereby improve the dimensional accuracy of the optical lenses.

In particular, in the press molding apparatus according to the second embodiment, the gaps are formed between the mother molds 102 and 104 and the supporting members 106 and 108, respectively. Therefore, the temperature difference ΔT between the both ends in the thickness direction of the mother molds 102 and 104 is reduced so that the warp is further suppressed. As a consequence, the dimensional accuracy of the optical lenses can further be improved.

The foregoing embodiments may be modified in various other manners within the scope of the appended claims. For example, each of the upper and the lower mother molds 102 and 104 has four molding surfaces in the foregoing embodiments. However, the number of the molding surfaces in each mother mold may be any desired number. In the foregoing embodiments, the upper mother mold 102 and the upper mold members 112 are separate components. However, the upper mother mold 102 and the upper mold members 112 may be implemented by an integral structure. Similarly, the lower mother mold 104 and the lower mold members 114 may be implemented by an integral structure.

In the foregoing embodiments, the anisothermal press molding was used. However, this invention is applicable in isothermal press molding in which the mother mold and the preforms put in the mother mold are heated together. In the foregoing embodiments, use is made of the mother mold holding a plurality of mold members having molding surfaces, respectively. Alternatively, the mother mold itself may have a plurality of molding surfaces.

Next, description will be made of a method of producing a lens (as a glass optical element) according to the third embodiment. At first, by high-frequency induction heating of the induction heating coils 122 and 124 of FIG. 7, the upper mother molds 102a and 102b and the lower mother molds 104a and 104b are heated, respectively. Next, the preforms preliminarily formed into a flat spherical shape are supplied to the lower mother molds 104a and 104b by the use of a transfer arm (not shown) after the preforms are preheated to a temperature higher than that of the upper mother molds 102a and 102b and the lower mother molds 104a and 104b. In order to supply the preforms to the lower mother molds 104a and 104b, the preforms are positioned above the molding surfaces A to F of the lower mother molds 104a and 104b by the use of a positioning member (not shown) and are dropped and supplied onto the lower mother molds 104a and 104b. Thereafter, the drive shaft 120 is moved upward to close the upper mother molds 102a and 102b and the lower mother molds 104a and 104b through the upper supporting shafts 110a and 110b and the lower supporting shafts 112a and 112b. As a consequence, the six preforms are pressed between the upper mother molds 102a and 102b and the lower mother molds 104a and 104b to form lenses having a desired shape. After completion of pressing of the preforms, the drive shaft 120 is moved downward to open or separate the upper and the lower molds 102 and 104. Subsequently, by the use of a removing member (not shown), six glass optical elements left on the lower mold 104 are sucked and removed. Thus, the lenses (glass optical elements) surface-processed with high precision are obtained.

As described above, in the press molding apparatus according to the third embodiment, press molding is carried out by the upper mother molds 102a and 102b and the lower mother molds 104a and 104b. Therefore, in case where a large number of (for example, six) preforms are pressed, each of the upper mother molds 102a and 102b and the lower mother molds 104a and 104b has a relatively small length. As a consequence, it is possible to suppress the effect of the warp of the upper mother molds 102a and 102b and the lower mother molds 104a and 104b due to the temperature distribution in the mother molds in the thickness direction and to prevent defective molding or damage resulting from the warp. Since the distance between the molding surfaces A to F and the supporting shafts can be suppressed to be small, temperature variation among the molding surfaces can be suppressed and the temperature variation among the mother molds can be suppressed. Thus, the press conditions in the respective molding surfaces can be kept uniform.

Furthermore, the upper mother molds 102a and 102b are supported by the upper supporting shafts 110a and 110b while the lower mother molds 104a and 104b are supported by the lower supporting shafts 112a and 112b. Therefore, it is possible to equalize the press conditions (such as pressing pressure) of the upper mother molds 102a and 102b and the lower mother molds 104a and 104b. The upper supporting shafts 110a and 110b are attached to the single common fixed shaft 118 while the lower supporting shafts 112a and 112b are attached to the single common drive shaft 120. Therefore, pressing can be accurately performed by the use of the single driving mechanism.

In addition, the molding surfaces A to F are arranged in a single line in each of the upper mother molds 102a and 102b. Therefore, efficient transfer using the transfer arm or the like can be carried out so that the productivity is improved.

The upper supporting shafts 110a and 110b support the centers of the upper mother molds 102a and 102b, respectively. The lower supporting shafts 112a and 112b support the centers of the lower mother molds 104a and 104b, respectively. Therefore, it is possible to apply uniform pressure to the preforms on the molding surfaces A to F.

The gap of 0.5–3 mm is kept between the upper mother molds 102a and 102b. Therefore, no interference is caused between the upper mother molds 102a and 102b to thereby perform excellent pressing. Likewise, the gap of 0.5–3 mm is kept between the lower mother molds 104a and 104b. Therefore, no interference is caused between the lower mother molds 104a and 104b to thereby perform excellent pressing.

In addition, the corners on the adjacent sides of the lower mother molds 104a and 104b are rounded. Therefore, the temperature distribution of the lower mother molds 104a and 104b can be kept further uniform. Likewise, the corners on the adjacent sides of the upper mother molds 102a and 102b are rounded. Therefore, the temperature distribution of the upper mother molds 102a and 102b can be kept further uniform.

Figure 10:
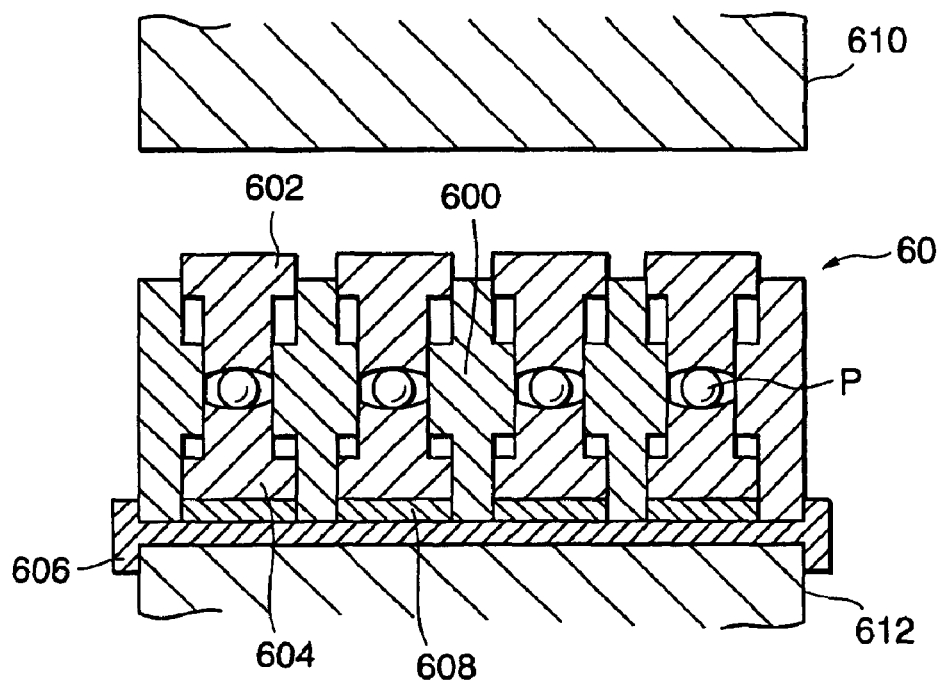
FIG. 10 shows a press molding apparatus according to a fourth embodiment of this invention.

Next, description will be made of a press molding apparatus according to a fourth embodiment of this invention. Referring to FIG. 10, the press molding apparatus comprises a pressing mold set including a pair of pressing molds 60 each of which comprises a mother mold 600 having an elongated shape and four pairs of upper and lower mold members 602 and 604 supported by the mother mold 600 to be vertically movable. In FIG. 10, only one of the two pressing molds 60 is illustrated. In each pressing mold 60, the upper mold members 602 and the lower mold members 604 are respectively arranged in a single line. The two pressing molds 60 are placed so that the upper mold members 602 and the lower mold members 604 are respectively arranged in a single line (in the transversal or horizontal direction in FIG. 10). The pressing mold set is surrounded by an induction heating coil (not shown) wound in a generally elliptical shape substantially along the outer contour of the pressing mold set.

Each of the upper and the lower mold members 602 and 604 is made of cemented carbide and has a molding surface (i.e., a surface for pressing a preform P) coated with a thin film of a precious metal alloy. The mother mold 600 is made of a tungsten alloy and has a thermal expansion coefficient slightly greater than that of cemented carbide. The pressing molds 60 are supported on a tray 606 which is attached to an upper end of a lower supporting shaft 612 driven in the vertical direction. Above the lower supporting shaft 612, an upper supporting shaft 610 as a fixed shaft is arranged. By moving the lower supporting shaft 612 upward, the upper mold members 602 are brought into contact with a head (lower end face) of the upper supporting shaft 610. As a consequence, pressing is performed between the upper and the lower mold members 602 and 604.

The two pressing molds 60 are similar in shape in plan view to the lower mother molds 104a and 104b illustrated in FIG. 8, except the number of the upper and the lower mold members. In the two pressing molds 60, each of the corners on the adjacent sides is shaped into a curve R or chamfered.

As a specific example, a biconvex lens having an outer diameter of 15 mm was produced by the use of the above-mentioned press molding apparatus and a spherical preform P of barium borosilicate glass (having a transition point of 512° C. and a sagging point of 545° C.). Specifically, the spherical preform P was placed between each of the upper mold members 602 and each of the lower mold members 604 of the mother mold 600. The mother mold 600 was mounted on the tray 606 and introduced into a molding chamber (not shown) kept in an inactive atmosphere. The tray 606 was placed on the lower supporting shaft 612 (FIG. 7). Thereafter, the lower supporting shaft 612 was moved upward so that the pressing molds 60 are located inside the induction heating coil. The induction heating coil is supplied with a high-frequency current to induction heat the mother mold 600. At this time, the temperature of each of lower molding surfaces (upper surfaces of the lower mold members 604) was measured by a mold temperature monitoring thermocouple inserted into each of the lower mold members 604. On the other hand, the temperature of each of upper molding surfaces (lower surfaces of the upper mold members 602) was measured by a mold temperature monitoring thermocouple inserted into each of the upper mold members 602. As a result, the temperature deviation among the lower molding surfaces and the upper molding surfaces during the induction heating was not greater than +10° C. Then, the preform was heated by the induction heating coil to 596° C. (the temperature corresponding to the glass viscosity of $10^8$ poises). Thereafter, the lower supporting shaft 612 was further moved upward to bring the upper surfaces of the upper mold members 602 into contact with the head of the upper supporting shaft 610 so that the preform P in a softened state was pressed. Subsequently, the lenses thus formed were cooled to a temperature not higher than the glass transition point. Thereafter, the lower supporting shaft 612 was moved downward and the lenses were removed together with the mother mold. As a result, the lenses thus obtained were excellent in dimensional accuracy with less astigmatic aberration and without nonuniform extension.

Figure 11:
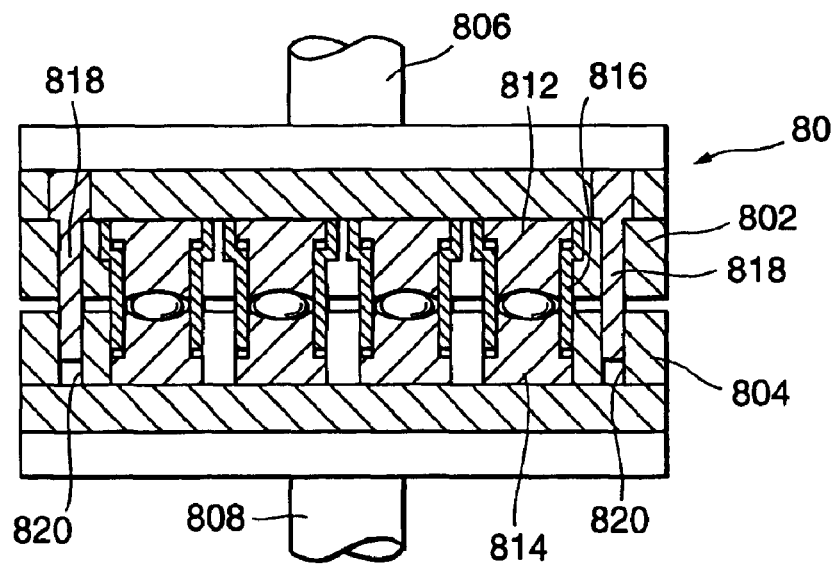
FIG. 11 shows a press molding apparatus according to a fifth embodiment of this invention.

Referring to FIG. 11, description will be made of a press molding apparatus according to a fifth embodiment of this invention. The press molding apparatus according to the fifth embodiment comprises a pressing mold set including a pair of pressing molds 80 each of which comprises an upper mother mold 802 and a lower mother mold 804 provided with four upper mold members 812 and four lower mold members 814, respectively. In FIG. 11, only one of the two pressing molds 80 is illustrated. In each of the pressing molds 80, the upper mold members 812 and the lower mold members 814 are respectively disposed in a single line so that the molding surfaces are arranged in a single line. The pressing mold set comprising the two pressing molds 80 is disposed so that the upper mold members 812 and the lower mold members 814 are respectively arranged in a single line (in the transversal or horizontal direction in FIG. 11). The pressing mold set is surrounded by an induction heating coil (not shown) wound in a generally elliptical shape substantially along the outer contour of the pressing mold set. The upper mother mold 802 is supported by an upper supporting shaft 806 as a fixed shaft. The lower mother mold 804 is fixed to a lower supporting shaft 808 driven in the vertical direction.

Each of the upper mold members 812 is provided with a sleeve 816 formed at its outer periphery and fitted to the lower mold member 814 with a small clearance to be slidable along the lower mold member 814. The sleeve 816 thus serves to prevent axial offset between upper and lower surfaces of a lens. The upper mother mold 802 is provided with guide pins 818 while the lower mother mold 804 is provided with guide holes 820 to be engaged with the guide pins 818. Each of the upper and the lower mother molds 802 and 804 is made of a tungsten alloy. Each of the upper mold members 812, the lower mold members 814, and the sleeves 816 is made of sintered silicon carbide with silicon carbide deposited thereon by CVD.

The two pressing molds 80 are similar in shape in plan view to the lower mother molds 104a and 104b illustrated in FIG. 8. In the two pressing molds 80, each of the corners on the adjacent sides is chamfered or shaped into a curve.

As a specific example, a biconvex lens (one surface being a spherical surface, the other surface being an aspherical surface) having an outer diameter of 10 mm was formed by pressing barium borosilicate glass (having a transition point of 512° C. and a sagging point of 545° C.) using the above-mentioned press molding apparatus. Specifically, preforms of a flat spherical shape prepared by hot molding and having no surface defect were preheated to 470° C. The preforms, four in number, were supplied onto the lower mold members 814, four in number, of the lower mother mold 804 preheated to about 470° C. Immediately thereafter, the lower mother mold 804 (having the length of 130 mm and the thickness of 35 mm) was moved upward to be coupled with the upper mother mold 802 preheated to 470° C. At this time, the guide pins 818 and the guide holes 820 were engaged with each other and the sleeves 816 were fitted over the lower mold members 814, respectively. By high-frequency induction heating by the induction heating coil, the upper and the lower mother molds 802 and 804 were heated so that the preforms were heated to 596° C. (i.e., the temperature at which the preform has a viscosity of $10^8$ poises). At this time, the temperature deviation among lower molding surfaces (upper surfaces of the lower mold members 814) and upper molding surfaces (lower surfaces of the upper mold members 812) was measured by the use of a mold temperature monitoring thermocouple. As a result, the temperature deviation was not greater than +10° C. Thereafter, the lower mother mold 804 was moved upward to perform press molding at the pressure of 70 kg/cm². At completion of the pressing, the temperature different in the thickness direction was about 40° C., and L×α×ΔT/t was 0.00077. After completion of the pressing, the lenses thus formed were cooled at a cooling rate of 50° C./min to a temperature not higher than the glass transition point. At this time, each of the upper mold members 812 followed the shrinkage of the lens and the lens was cooled under the weight of the upper mold member 812 alone. In other words, the upper surface of the lens was kept in contact with the upper mold member 812 during cooling. When the temperature was lowered to 490° C., the lower mother mold 804 was moved downward to separate the upper and the lower mother molds 802 and 804 from each other. The lower mother mold 804 was further moved downward to a lower part of a molding chamber (not shown). By the use of a suction pad, four lenses were removed. The lenses thus removed may thereafter be annealed if desired. In these molds (the upper and the lower mother molds 802 and 804, the upper and the lower mold members 812 and 814), substantially uniform heating and cooling were performed. The lenses thus obtained were high in dimensional accuracy and excellent in surface quality. In addition, eccentricity or decenter after centration was excellent.

Next, description will be made of a sixth embodiment of this invention. A press molding apparatus according to the sixth embodiment comprises a pressing mold set including a pair of pressing molds which is similar in structure to those of the fifth embodiment except that an upper mother mold 802 and a lower mother mold 804 comprise three upper mold members 812 and three lower mold members 814, respectively. Each of the upper and the lower mother molds and the upper and the lower mold members is similar in structure to that in the fifth embodiment (except the number of the upper and the lower mold members). Similar parts are designated by like reference numerals. The two pressing molds are similar in shape in plan view to the lower mother molds 104a and 104b illustrated in FIG. 8. In the two mother molds, each of the corners on adjacent sides is chamfered or shaped into a curve.

As a specific example, a biconvex lens having a diameter of 10 mm was formed by the use of the above-mentioned press molding apparatus. At first, the upper and the lower mother molds 802 and 804 (having the length of 100 mm and the thickness of 35 mm) were induction heated by induction heating coils to obtain mold temperatures shown in Table 2. Three kinds of the mold temperatures were set as shown in Table 2. The temperature deviation among lower molding surfaces (upper surfaces of the lower mold members 814) and upper molding surfaces (lower surfaces of the upper mold members 812) was measured by the use of a mold temperature monitoring thermocouple. As a result, the temperature deviation was not greater than +10° C.

TABLE 2

| at the start of pressing | | |
|---|---|---|
| preform temperature (viscosity (poise)) | mold temperature (viscosity (poise)) | releasing temperature (° C.) |
| 680 ($10^{5.8}$) | 549 ($10^{10.2}$) | 485 |
| 643 ($10^{6.8}$) | 567 ($10^{9.2}$) | 495 |
| 615 ($10^{7.4}$) | 590 ($10^{8.2}$) | 505 |

Then, three preforms were floated on a transfer arm (not shown) by gas stream and transferred. Thereafter, the transfer arm was placed at a position directly above the three lower mold members 814 and the preforms were simultaneously dropped and supplied onto the lower mold members 814. The preforms were preheated at three different preheat temperatures as shown in Table 2. Thereafter, the transfer arm was immediately retreated from the position above the lower mother mold 804. The induction heating coils were deenergized. A lower supporting shaft 808 was moved upward and pressing was performed under the pressure of 70 kg/cm$^2$. At completion of the pressing, the temperature difference in the thickness direction was 39° C. which leads that L×α×ΔT/t of 0.00058. After completion of the pressing, the lenses thus formed were cooled down to the temperature not higher than the glass transition point. During cooling, the lenses were applied with the weight of the upper mold member 812 alone. Thereafter, the lower mother mold 804 was moved downward by about 40 mm to separate or part the upper and the lower mother molds 802 and 804 from each other. By the use of a suction pad, the lenses were removed. By the induction heating coil, the upper and the lower mother molds were immediately recovered to a pressing start temperature to execute a next molding cycle in the similar manner.

As a result, under any molding condition shown in Table 2, high-quality lenses were continuously obtained. Thus, it is understood that, according to this embodiment, a large amount of lenses can be continuously produced with high efficiency.

In the third through the sixth embodiments, the pressing mold set comprises the upper mold 102 and the lower mold 104 each of which includes the two mother molds. Alternatively, the number of the mother molds may be three or more. Preferably, these mother molds are equal in width to one another (in the longitudinal direction of the pressing mold set). In the third through the sixth embodiments, each of the upper and the lower molds 102 and 104 has the three or four molding surfaces. However, the number of the molding surfaces may be smaller or greater. Alternatively, each mother mold may have only one molding surface.

As described above, according to this invention, the mother mold satisfies the relationship given by L·α·ΔT/t<0.0008 with respect to the length L, the thickness t, the thermal expansion coefficient α, and the temperature difference ΔT produced between the both ends in the thickness direction during press molding. Therefore, it is possible to suppress the warp of the mother mold, thereby improving the dimensional accuracy of the optical element formed by each molding surface.

As described above, according to this invention, the pressing mold set comprising a plurality of mother molds is collectively heated by the induction heating coil and the mother molds are supported by the individual supporting shafts, respectively. With this structure, even in case where a plurality of materials are simultaneously press formed, the optical elements excellent in dimensional accuracy can be obtained. This is because the distances between the molding surfaces and the supporting shafts can be reduced and the temperature distributions in the mother molds can be kept uniform, thereby keeping the uniform press conditions at the respective molding surfaces. Even in case where the optical elements are simultaneously obtained by press molding by the use of the mother molds having a plurality of molding surfaces adapted to form the optical elements having a diameter of 10 mm or more, the optical elements excellent in dimensional accuracy can be obtained.

Furthermore, since the mother molds are supported by the individual supporting shafts, the press conditions by the respective mother molds can be kept substantially uniform. In addition, since the pressing mold set comprises a plurality of mother molds, each individual mother mold can be reduced in length. Therefore, even when a plurality of materials are simultaneously pressed or even when a plurality of optical elements having a medium aperture size or more are simultaneously obtained by press molding, it is possible to satisfy the relationship (1) and thus to suppress the warp of the mother molds due to the heat.

What is claimed is:

1. A press molding apparatus for simultaneously press molding a plurality of materials into a plurality of optical elements, comprising:

at least one upper mother mold and at least one lower mother mold, each having a shape extending in a direction;

a plurality of upper molding surfaces and a plurality of lower molding surfaces aligned on the at least one upper mother mold and the at least one lower mother mold, respectively, in said direction;

a heater for heating the upper and/or the lower mother molds;

upper and lower supporting members each for supporting the at least one upper mother mold and the at least one lower mother molds so that the upper molding surfaces and the lower molding surfaces are faced to each other; and a drive shaft coupled to the upper supporting member or the lower supporting member so that the upper mother mold or the lower mother mold move towards and away from each other for press molding;

wherein each of the upper and the lower mother molds satisfies the relationship given by:

$$L \times \alpha \times \Delta T / t < 0.0008, \quad (1)$$

where L represents the length (mm) of the mother mold in said direction, t, the thickness (mm) of the mother mold, α, the thermal expansion coefficient (/° C.) of the mother mold, and ΔT, the temperature difference (° C.) produced between both ends in the thickness direction of the mother mold during the press molding.

2. The press molding apparatus according to claim 1, further comprising:

a plurality of the upper mother molds and a plurality of the lower mother molds, wherein the plurality of the upper and the lower molding surfaces are aligned on the plurality of the upper mother molds and the plurality of the lower mother molds in said direction.

3. The press molding apparatus according to claim 1, wherein the heater comprises a single induction heating coil surrounding the at least one upper mother mold or the at least one lower mother mold.

4. The press molding apparatus according to claim 1, wherein the apparatus comprises:

a pressing mold set comprising a plurality of the upper mother molds and a plurality of the lower mother molds disposed so that the upper molding surfaces and the lower molding surfaces are aligned in said direction; and a plurality of support shaft each supporting each of the upper mother molds and the lower mother molds of said pressing mold set;

wherein the upper mother mold and/or the lower mother molds are moved by the drive shaft through the supporting shafts to move towards and away from each other.

5. The press molding apparatus according to claim 4, wherein each of the upper mother molds and each of the lower mother molds of the pressing mold set have a plurality of the upper molding surfaces and the lower molding surfaces, respectively.

6. The press molding apparatus according to claim 5, further comprising:

an induction heating coil surrounding the pressing mold set to collectively heat the upper and the lower mother molds by induction heating, the upper and the lower mother molds having rounded corners on sides adjacent to each other.

7. The press molding apparatus according to claim 4, wherein the drive shaft has a center axis substantially coincident with the center of the pressing mold set in its longitudinal direction.

8. The press molding method for obtaining a plurality of optical elements by simultaneously press molding a plurality of materials, comprising the steps of:

preparing a molding apparatus comprising at least one upper mother mold and at least one lower mother mold, each having a shape extending in a direction, a plurality of upper molding surfaces and a plurality of lower molding surfaces being aligned on the at least one upper mother mold and the at least one lower mother mold, respectively, in said direction, and the upper molding surfaces and the lower molding surfaces being faced to each other;

heating the upper and the lower mother molds; and press molding the materials with the upper and the lower molding surfaces by driving the upper or the lower mother mold, wherein:

each of the upper and the lower mother molds satisfies the relationship given by:

$$L \times \alpha \times \Delta T / t < 0.0008, \quad (1)$$

where L represents the length (mm) of the mother mold in said direction, t, the thickness (mm) of the mother mold, $\alpha$, the thermal expansion coefficient (/° C.) of the mother mold, and $\Delta T$, the temperature difference (° C.) produced between both ends in the thickness direction of the mother mold during the press molding.

9. The press molding method according to claim 8, wherein:

the press molding apparatus comprises a plurality of the upper mother molds and a plurality of the lower mother molds, and the plurality of the upper molding surfaces and the lower molding surfaces are aligned on said plurality of the upper mother molds and a plurality of the lower mother molds, respectively, in said direction.

10. The press molding method according to claim 8, wherein;

the heating is carried out by a single induction heating coil surrounding at least one of the upper or the lower mother molds.

11. The press molding method according to claim 8, wherein:

said molding apparatus comprises a pressing mold set comprising a plurality of the upper mother molds and a plurality of the lower mother molds disposed so that the upper molding surfaces and the lower molding surfaces are aligned in said direction; and said press molding is carried out by press molding the materials with the upper and the lower molding surfaces by driving the upper mother molds or the lower mother molds, each of the upper mother molds and the lower mother molds being supported by a support shaft.

12. The press molding method according to claim 11, wherein:

the materials are heated to a temperature higher than that of the upper and the lower mother molds and softened before the materials are supplied to the molding surfaces.

13. The press molding method according to claim 11, wherein:

the materials are glass materials which are heated to a temperature corresponding to the viscosity not higher than $10^9$ poises before the materials are supplied to the molding surfaces.

* * * * *